United States Patent
Grusy et al.

(10) Patent No.: US 8,671,253 B2
(45) Date of Patent: *Mar. 11, 2014

(54) FACILITATION OF SIMULTANEOUS STORAGE INITIALIZATION AND DATA DESTAGE

(71) Applicant: International Business Machines Corporation, Armonk, NY (US)

(72) Inventors: Ellen J. Grusy, Tucson, AZ (US);
Matthew J. Kalos, Tucson, AZ (US);
Kurt A. Lovrien, Tucson, AZ (US);
Matthew Sanchez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/732,503

(22) Filed: Jan. 2, 2013

(65) Prior Publication Data

US 2013/0124812 A1 May 16, 2013

Related U.S. Application Data

(63) Continuation of application No. 12/857,735, filed on Aug. 17, 2010, now Pat. No. 8,352,691.

(51) Int. Cl.
*G06F 13/00* (2006.01)
*G06F 13/28* (2006.01)

(52) U.S. Cl.
USPC .............. 711/156; 711/150; 711/E12.001; 713/1

(58) Field of Classification Search
USPC ............ 711/156, 150, E12.001; 713/1
See application file for complete search history.

(56) References Cited

U.S. PATENT DOCUMENTS

| 4,394,733 | A | 7/1983 | Swenson | |
|---|---|---|---|---|
| 6,516,379 | B1 | 2/2003 | Deshpande et al. | |
| 6,529,990 | B1 | 3/2003 | Kruse et al. | |
| 6,988,171 | B2 | 1/2006 | Beardsley et al. | |
| 8,352,691 | B2 * | 1/2013 | Grusy et al. | 711/156 |
| 2004/0215877 | A1 * | 10/2004 | Chatterjee et al. | 711/114 |
| 2006/0136662 | A1 * | 6/2006 | Forrer et al. | 711/112 |

OTHER PUBLICATIONS

Sudhindra R. Rao, "Data management in DEFER Cache—Implementation and Analysis," University of Cincinnati, 2003, 76 pages.
Ohad Rodeh, "B-trees, Shadowing, and Clones," ACM Transactions on Storage, vol. 3, No. 4, Article 15, Feb. 2008, 27 pages.
Jukka Teuhola, "Exernal Duplicate Deletion with Large Main Memories," Dept. Of Computer Science, Univ. of Turku, Finland, 1991-1992, 10 pages.

* cited by examiner

*Primary Examiner* — Edward Dudek, Jr.
(74) *Attorney, Agent, or Firm* — Griffiths & Seaton PLLC

(57) ABSTRACT

Various embodiments for storage initialization and data destage in a computing storage environment are provided. At least a portion of data on a storage device is initialized using a background process, while one of simultaneously and subsequently destaging the at least the portion of the data to the storage device using a foreground process is performed. A persistent metadata bitmap, adapted to indicate whether the at least the portion of the data has been initialized, is staged to cache, the cache operable in the computing storage environment. The background process maintains a volatile bitmap indicating a status of the initialization of the at least the portion of the data in direct correspondence to the metadata bitmap. As the background process initializes the at least the portion of the data, an applicable bit on the persistent metadata bitmap is cleared and a corresponding bit is set on the volatile bitmap.

18 Claims, 7 Drawing Sheets

FACILITATION OF SIMULTANEOUS STORAGE INITIALIZATION AND DATA DESTAGE

CROSS-REFERENCE TO RELATED APPLICATIONS

This application is a Continuation of U.S. patent application Ser. No. 12/857,735, filed on Aug. 17, 2010.

BACKGROUND OF THE INVENTION

1. Field of the Invention

The present invention relates in general to computers, and more particularly to a method, system, and computer program product for facilitation of simultaneous storage initialization and data destage in a computing storage environment.

2. Description of the Related Art

In enterprise data processing arrangements, such as may be used in a company, government agency or other entity, information is often stored on servers and accessed by users over, for example, a network. The information may comprise any type of information that of programs and/or data to be processed. Users, using their personal computers, workstations, or the like (generally, "computers") will enable their computers to retrieve information to be processed, and, in addition, to store information, for example, on remote servers.

Generally, servers store data in mass storage subsystems that typically include a number of disk storage units. Data is stored in units, such as files. In a server, a file may be stored on one disk storage unit, or alternatively portions of a file may be stored on several disk storage units. A server may service access requests from a number of users concurrently, and it will be appreciated that it will be preferable that concurrently serviced access operations be in connection with information that is distributed across multiple disk storage units, so that they can be serviced concurrently. Otherwise stated, it is generally desirable to store information in disk storage units in such a manner that one disk drive unit not be heavily loaded, or busy servicing accesses, and while others are lightly loaded or idle. To provide redundancy and increase performance, many storage devices may be configured in a redundant array of independent disks (RAID) topology, where storage volumes are organized in RAID ranks.

A computer network of a business may have multiple storage networks that are located remote from one another and a business user. The storage networks may also be hosted on different types of systems. To perform the job correctly, the business user may require fast and reliable access to the data contained in all of the storage networks. Since access to this data occurs in real time, is desirable that storage operations (such as write or reads) occur as quickly as possible.

SUMMARY OF THE INVENTION

To achieve greater storage performance and reliability for customers, a variety of improvements to storage environments continue to be made. The so-called "thin provisioning" paradigm has become common in enterprise data processing systems. Thin provisioning allows administrators to configure logical storage units, such as volumes, without "real" or physically allocated storage behind them. "Real" storage is then allocated on demand. Control units perform the allocation of the storage in the data processing system in chunks of data referred to as extents, or contiguous areas of storage on a computer file system. Extents may vary in size, but are generally constant within a given control unit.

An additional mechanism for improving storage performance in enterprise data processing systems envisions initializing (formatting) a portion of storage while concurrently destaging data to an associated storage device. To implement such a mechanism, such initialization may be performed by a background task occurring in conjunction with a foreground initialization task spawned by requests for destages of data from cache to the storage device. To avoid the potential for data integrity issues, a protective mechanism (such as handshaking) between the foreground initialization tasks and the background initialization tasks should be put in place.

In view of the foregoing, a need exists for a mechanism for a mechanism to facilitate simultaneous storage initialization and data destage, while addressing potential data integrity issues such as that previously described. Accordingly, various method, system, and computer program product embodiments for storage initialization and data destage in a computing storage environment are provided. In one exemplary embodiment, by way of example only, at least a portion of data on a storage device is initialized using a background process, while one of simultaneously and subsequently destaging the at least the portion of the data to the storage device using a foreground process is performed. A persistent metadata bitmap, adapted to indicate whether the at least the portion of the data has been initialized, is staged to cache, the cache operable in the computing storage environment. The background process maintains a volatile bitmap indicating a status of the initialization of the at least the portion of storage in direct correspondence to the persistent metadata bitmap, the volatile bitmap examined in conjunction with the cached metadata bitmap to determine if a data collision has occurred. As the background process initializes the at least the portion of the data, an applicable bit on the cached metadata bitmap is cleared and a corresponding bit is set on the volatile bitmap. Previous to commencing destaging the at least the portion of the data, the value of the applicable bit on the read data bitmap is determined. If the bit in the read metadata bitmap is found to be clear and the corresponding bit on the volatile bitmap is not set a work queue lock is placed on the at least the portion of the data Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below describe efficient and highly scalable mechanisms for concurrent facilitation of initialization of storage and data destage to an associated storage device. In one of the illustrated embodiments, a handshaking mechanism is employed between a background storage initialization (performed on a storage unit such as a disk) and a foreground data destage task using a lock-protected queue of data structures, a metadata bitmap that has been staged to cache, and a corresponding volatile bitmap to determine if a data collision has taken place, taking appropriate action under the circumstances as will be further described.

Figure 1:
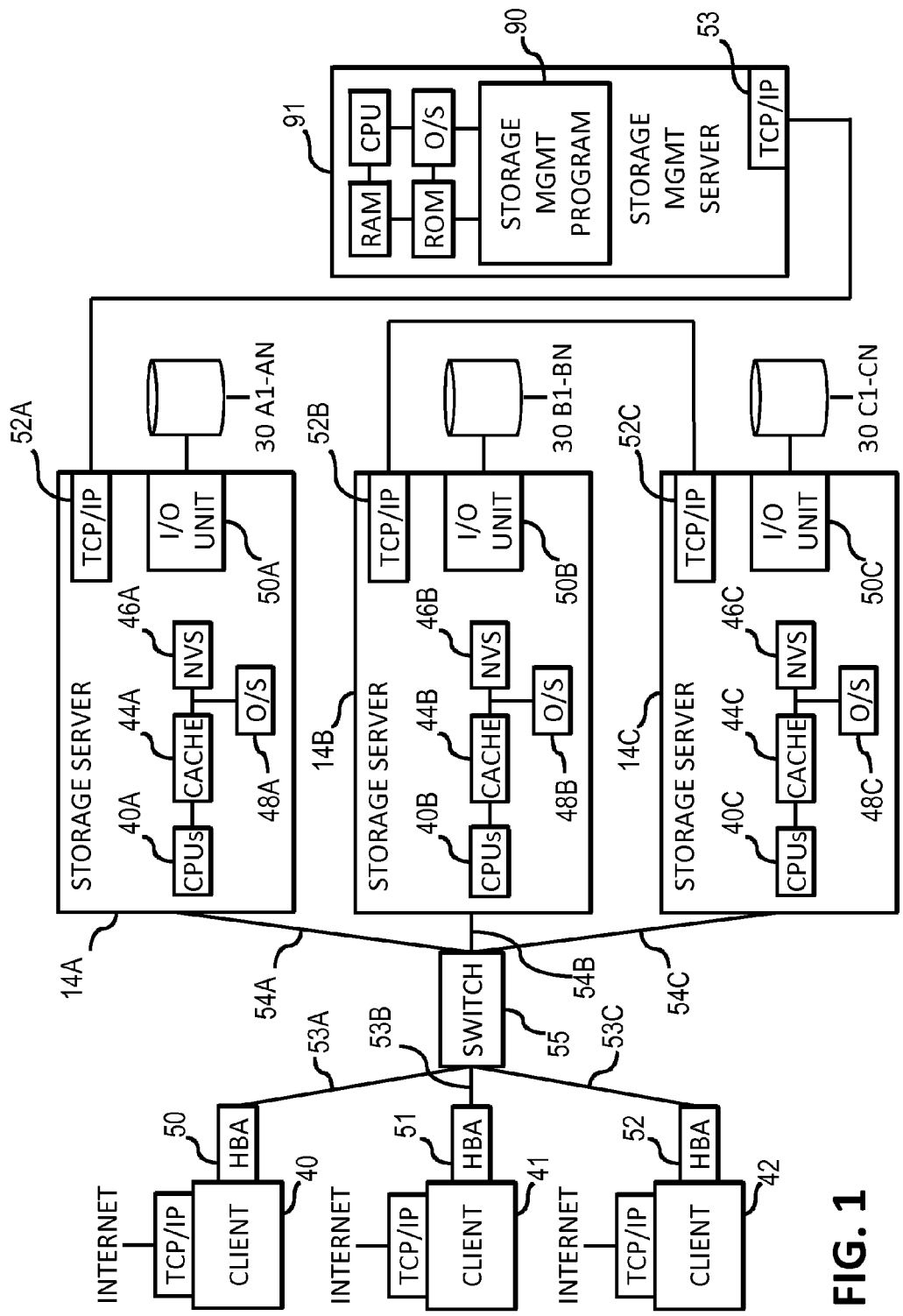
FIG. 1 is a block diagram of a distributed computer system including storage servers and a storage management server, in which aspects of the following description and claimed subject matter may be implemented.

FIG. 1 hereafter provides one example of a portion of a mirrored data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

FIG. 1 illustrates an exemplary distributed computer system generally designated 10 which includes the present invention. System 10 comprises multiple, similar storage servers/controllers 14 *a,b,c* with multiple CPUs 40 *a,b,c* per cluster (See FIG. 2, following, for CPU organization in each cluster), cache 44 *a,b,c*, nonvolatile storage ("NVS") 46 *a,b,c*, operating system 48 *a,b,c*, I/O unit 50 *a,b,c*, and TCP/IP adapter card 52 *a,b,c*. Each of the storage servers 14 *a,b,c* manages storage allocation and access to multiple storage devices (such as disks) 30 *a*1-*an*, 30 *b*1-*bn*, and 30 *c*1-*cn*, respectively, by clients 40, 41 and 42.

Clients 40, 41 and 42 have adapter cards 50, 51 and 52, such as a Fibre Channel adapter cards, for connection via a communication path 53 *a,b,c*, such as a Fibre Channel, to a switch 55. Switch 55 can be coupled to storage servers 14 *a,b,c* via host busses 54 *a,b,c*, and can forward a request from any of the clients 40, 41 or 42 to any of the storage servers 14 *a,b,c* as configured on the client. An administrator has allocated to each of the clients 40, 41 and 42 a number of storage "volumes." Each "volume" resides on a storage array. A "storage array" can comprise one or more storage devices and be configured in a variety of RAID levels such as RAID 5, RAID 10 or Just a Bunch of Disks (commonly referred to as JBOD).

Figure 2:
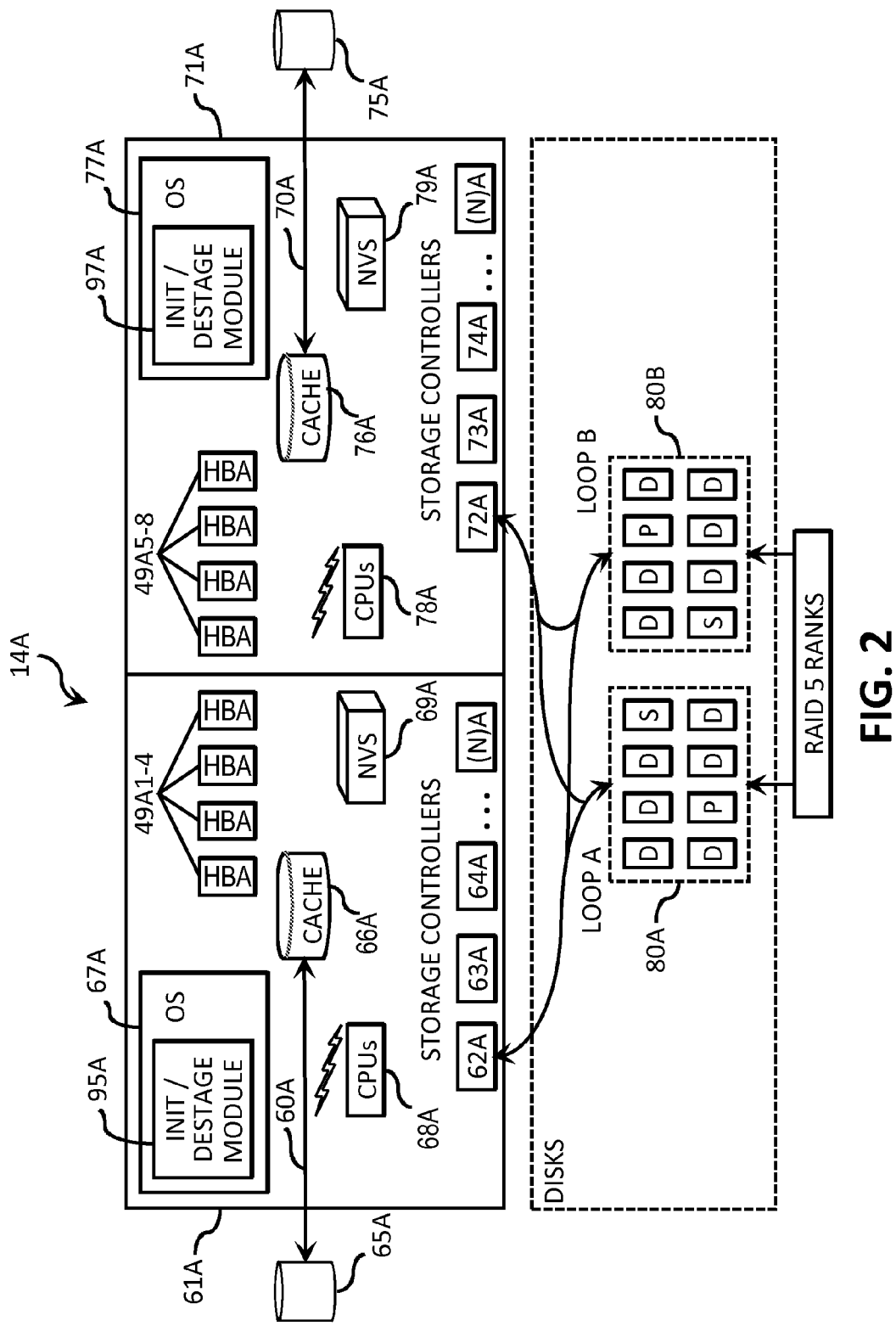
FIG. 2 is a block diagram of one of the storage servers of FIG. 1.

In the exemplary embodiment illustrated in FIG. 2, storage controller 14*a* (and likewise storage controller 14*b* and *c*) includes two identical clusters 61*a* and 71*a* of CPUs 68*a* and 78*a*, cache 66*a* and 76*a*, NVS 69*a* and 79*a*, and any number of pairs of device adapters (62*a*-(N)a and 72*a*-(N)a per cluster). There is a shared cache (semiconductor) memory 66*a* and 76*a* for each cluster 61*a* and 71*a*, respectively. Cache 66*a* and 76*a* each contain a directory of data files stored on each cache, respectively. The directory includes any number of directory entries associated with each of the data files.

Each cluster also contains battery backed-up storage 69*a* and 79*a* (also called "NVS"). In FIG. 2, "D" represents a data disk, "P" represents a parity disk for storing parity bits for the data in the data disks, and "S" represents a spare disk in the event of failure of a data disk or parity disk. Each cluster maintains a mapping of the storage allocation to each client that correlates each storage volume to corresponding physical locations on the storage arrays.

NVS 69*a* and 79*a* are interconnected with disks 65*a* and 75*a* via communication links 60*a* and 70*a*, respectively. In certain embodiments, communication links 60*a* and 70*a* are selected from a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, disks 65*a* and 75*a* comprise one or more optical storage media, one or more magnetic storage media, one or more electronic storage media, and combinations thereof. In certain embodiments, disks 65*a* and 75*a* are external to clusters 61*a* and 71*a*. In certain embodiments, disks 65*a* and 75*a* are internal to clusters 61*a* and 71*a*.

When the client requests access to storage, i.e. to read from or write to data in one of the volumes allocated to the client, then the storage cluster that manages that volume will process the request, i.e. temporarily store client updates into the cache memory and NVS on the paired cluster. For update requests, an I/O completion notification is sent to the client upon NVS store. Upon reaching an internal threshold for pending writes, the cluster will map the client request to the physical locations, and then forward the mapped request from the cache storage to the appropriate storage array. For read requests, data is either satisfied from cache memory or requires disk access (because of a "cache miss"). Cache misses for read requests require the cluster to map the client request to the physical locations on the storage array and transfer the data from the physical location on the arrays to the cache memory where it satisfies the client I/O request.

Referring again to FIG. 1, system 10 also includes a storage management program (SMP) module 90 in a storage management server 91, according to the present invention to detect failover occurrences, implement the aforementioned preserved memory cache, and process the retained tracks. In the illustrated embodiment, computer 91 is coupled to storage servers 14 *a,b,c* via a SAN network. Alternately, there can be a separate instance of module 90 executing on each storage server/controller 14 *a,b,c* and communicating with the other instances of program 90 on the other storage servers via a TCP/IP network. One of ordinary skill in the art will appreciate that a variety of implementations of SMP module in communication with the overall storage subsystem are contemplated.

Referring again to FIG. 2, server 14*a* is shown including operating systems 67*a* and 77*a*, one for each cluster. As one of ordinary skill in the art will appreciate, operating systems 67*a* and 77*a* may be physically or virtually placed in a variety of locations. For purposes of illustration, the operating systems 67*a* and 77*a* are shown incorporated into each cluster as shown. In one embodiment, CPUs 68*a* and 78*a* may execute portions of the operating systems 67*a* and 77*a*. Each operating system 67*a* and 77*a* includes initialization/destage modules 95*a*, 97*a*, as is shown. In one embodiment, initialization/ destage modules 95a and 97a may operate to implement various aspects of the present invention, in conjunction with the operating systems 67a and 77a, the depicted CPUs, cache memory, NVS, etc., such as carrying out initialization processes for a portion of storage while concurrently and/or subsequently destaging data to an associated storage device. While initialization/destage modules 95a and 97a are shown incorporated into the operating systems 67a and 77a, one of ordinary skill in the art will appreciate that the initialization/destage modules may be physically or logically located elsewhere, yet remain in communication with the depicted CPUs, cache memory, NVS, etc. The functionality of initialization/destage modules 95a and 97a will be further described, following.

As previously described, an extent may be considered a contiguous area of storage. In one embodiment, an extent may be 1 GB in size. One of ordinary skill in the art will appreciate that extents may vary in size, however. The mechanisms of the present invention may be operable on portions of data such as extents, for example. However, one of ordinary skill in the art will appreciate that other measurements of storage may be utilized, physical (such as a track or stride) or logical (such as a volume). To this regard, the illustrated embodiments refer to the functionality of initialization and data destage operable on portions of storage.

Storage initialization work may be divisible by these portions of storage (such as a certain number of tracks). To facilitate such initialization while concurrently destaging portions of data, a metadata bitmap made persistent (hardened to storage) may be utilized as will be further described. Each bit in the bitmap may correspond to a predefined portion of the storage (such as the aforementioned tracks). If the metadata bit is clear (e.g., 0), the corresponding portion of storage is thought to be or have been initialized. If the destage task operating as a foreground process observes that a particular storage portion requires initialization (e.g., the metadata bit is set), the foreground process may be adapted to perform the initialization work itself. As will be further described, a lock-protected queue of data structures may be maintained for ownership of this initialization work (as between foreground and background processes and between threads of the same process. In this regard, only a single thread of the background task or the foreground task may have ownership of initialization of a particular portion of storage.

The persistent metadata previously mentioned may be staged to cache (e.g., cache 66a, 76b in FIG. 2) to perform the background task initialization work. In addition, the background task may maintain a volatile bitmap (as will be further described), with each bit corresponding to a particular portion of storage in direct correlation to the bitmap in the metadata. Accordingly, in one exemplary embodiment, as the background task initializes a data portion, the cached metadata bit is cleared and the corresponding bit may be set in the volatile bitmap.

Pursuant to these mechanisms, the foreground initialization task may query the state of the initialization if the corresponding bit in the cached metadata bitmap is found to be cleared. This query may, in one embodiment, result in one of three answers. In a first situation, the background task is not working on a particular storage portion, or the bit in its volatile bitmap is not set. In this scenario, the answer provided to the foreground task is that the data portion has been initialized, and the bit indicating such initialization has been hardened. Accordingly, it is appropriate to perform a data destage operation to the storage portion.

In a second situation, the background task is working on a particular storage portion, and the corresponding bit in the volatile bitmap is set. In this scenario, the answer provided to the foreground task is that the storage portion has been initialized, but the metadata is still in need of hardening. Accordingly, the query instructs the foreground process that it will later reply with an acknowledgment. If the data destage fails, the volatile bitmap may be OR-ed with the metadata in cache, in that what is in cache matches what is found on an associated storage device. Once the background task has completed destage or attempted destage of the metadata, the foreground task is notified. This is useful to maintain data integrity. If data is destaged to the portion of storage whose metadata bit indicates initialized but the metadata had not yet been hardened, a subsequent reboot/system restart would result in staging stale metadata from disk where the metadata bit is set indicating the portion of storage is uninitialized. This would result in the portion of storage being re-initialized, overwriting that data that had been previously destaged.

In a third situation, the background task is not working on a particular storage portion, or the bit in the corresponding volatile bitmap is not set. However, the query determines the metadata bit is now set or finds the applicable work to be performed queued on a data structure work queue (whose functionality will be further described). In this scenario, the answer provided to the foreground task is that the background process is not currently working on the particular storage portion, but now has determined that the metadata bit now shows the bit to be set, or found on another thread that has ownership of such process.

In contrast to the functionality of the background process, the foreground process, in one embodiment, is operable to examine the metadata bit corresponding to the particular storage portion to be staged. If the metadata bit is set, the foreground task examines the lock-protected data work queue (again as will be described), and if no task is in process of initialization, takes ownership of the initialization. If the metadata bit is clear (indicating the particular portion of storage has been initialized, the foreground task queries about the state of the initialization. If the reply indicates that the storage portion has been initialized and the corresponding bit indicating requirement for hardening of the cached metadata bitmap in the volatile bitmap is not set, the foreground process proceeds with destaging the data to an associated storage device.

Alternatively, if the reply indicates that the background process has initialized the storage portion, but that the metadata is still in need of hardening to storage, the foreground process waits for a reply from the background process following the destage, or attempted destage, of the metadata. Once the callback is received, the foreground process examines the metadata and volatile bits in case destage of the metadata failed. Finally, if the reply indicates that the background process is not in the process of working on the portion of storage, but the metadata bit is set or the work is determined to be hanging on the lock-protected work queue, the foreground returns to perform the bit checking functionality again as previously described.

Lock protection functionality may be implemented across various aspects of the mechanisms of the present invention. For example, such lock protection may be involved in checking metadata bits, checking the work queue for work already in progress, and hanging the work on the queue. Once a particular initialization or destage process (e.g., work item) is placed on a queue, access to the applicable portion of data is forbidden by other threads of the foreground and background processes, even though the metadata bit may still be set (i.e., showing that the portion of storage requires initialization). The work item is not removed from the queue until the owning thread has performed all the initialization work necessary, has set or cleared the appropriate bits, and possibly destaged (hardened) the metadata to storage. As with any queue of data structures, the lock protection is additionally utilized to retain the integrity of the work queue "next" and "previous" if multiple threads are simultaneously adding and/or removing data structures to/from the queue.

Turning to FIGS. 3, 4, 5, and 6, following, exemplary methods 100, 150, 200, and 220 for facilitating concurrent storage initialization and data destage to an associated storage device according to the previously described mechanisms are illustrated in embodiments featuring extents as contiguous storage and strides as the particular portions of storage as previously described. As one skilled in the art will appreciate, various steps in the methods 100, 150, 200, and 220 may be implemented in differing ways to suit a particular application. In addition, the described methods may be implemented by various means, such as hardware, software, firmware, or a combination thereof operational on or otherwise associated with the storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Figure 3:
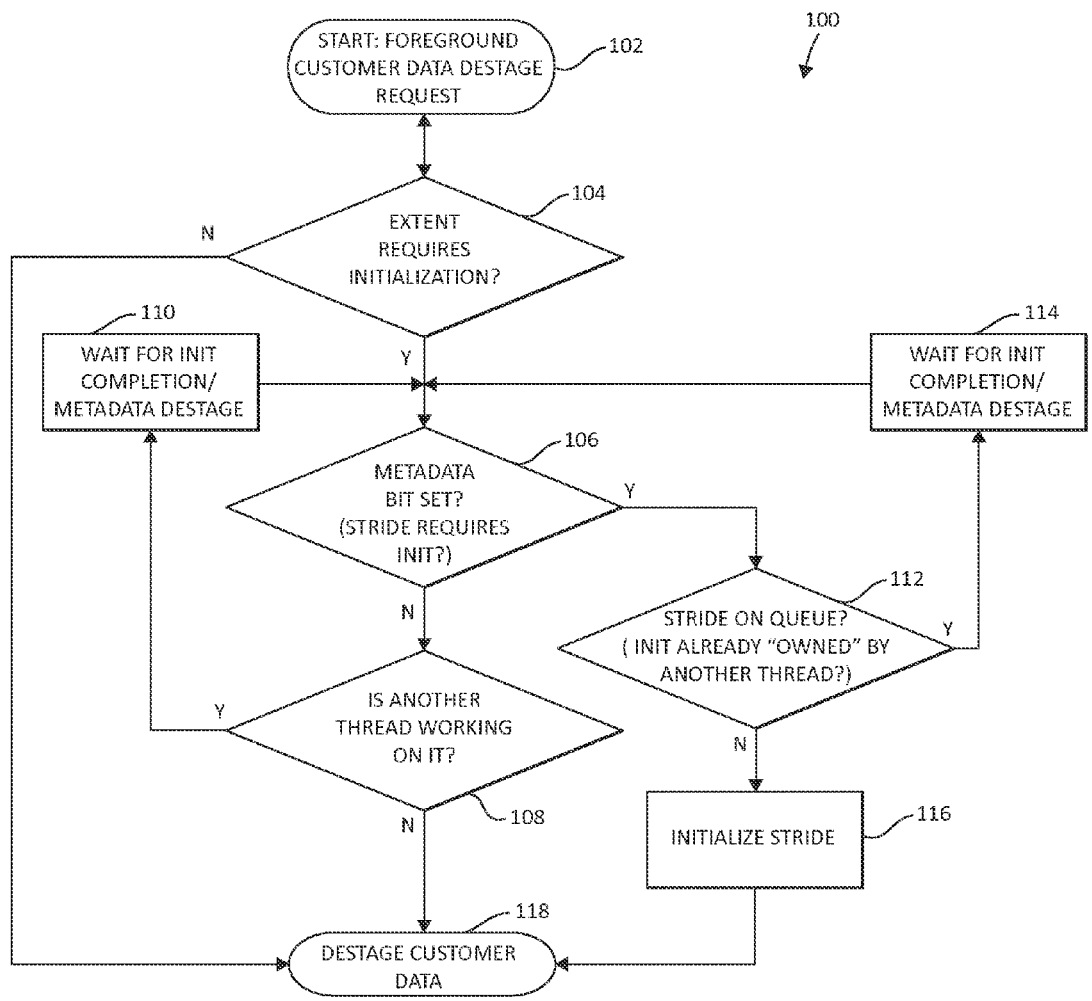
FIG. 3 is a flow chart diagram of an exemplary method for initialization and destage according to the present invention.

Turning first to FIG. 3, an exemplary method 100 for simultaneous and/or concurrent storage initialization and data destage is illustrated. In a first step, a data destage request is received (step 102). If the data extent requires initialization (step 104), the method 100 queries the metadata bitmap to determine if the applicable metadata bit is set (indicating that the associated stride requires initialization). If this is not the case, the method 100 then queries if another thread is working on the stride (step 108) pursuant to a lock-protection mechanism. If this is the case, the method 100 waits for the completion of initialization and metadata destage (step 110), returning to step 106 as shown.

Returning to step 106, if the method 100 determines that the associated metadata bit is set, then the method 100 queries (again pursuant to the lock-protection mechanism) if the stride is on queue (e.g., the initialization is already "owned" by another thread) (step 112). If this is the case, the method 100 again waits for the completion of the initialization and associated metadata destage (step 114) and returns to step 106 as previously described. If the stride is determined not to be on the work queue, the method 100 itself takes ownership and initializes the stride (step 116), and proceeds to destage the customer data to the associated storage device (step 118). Returning to step 104, if the method 100 previously determines that a particular extent in question does not require initialization, the method moves to step 118 to destage the data as previously described.

Figure 4:
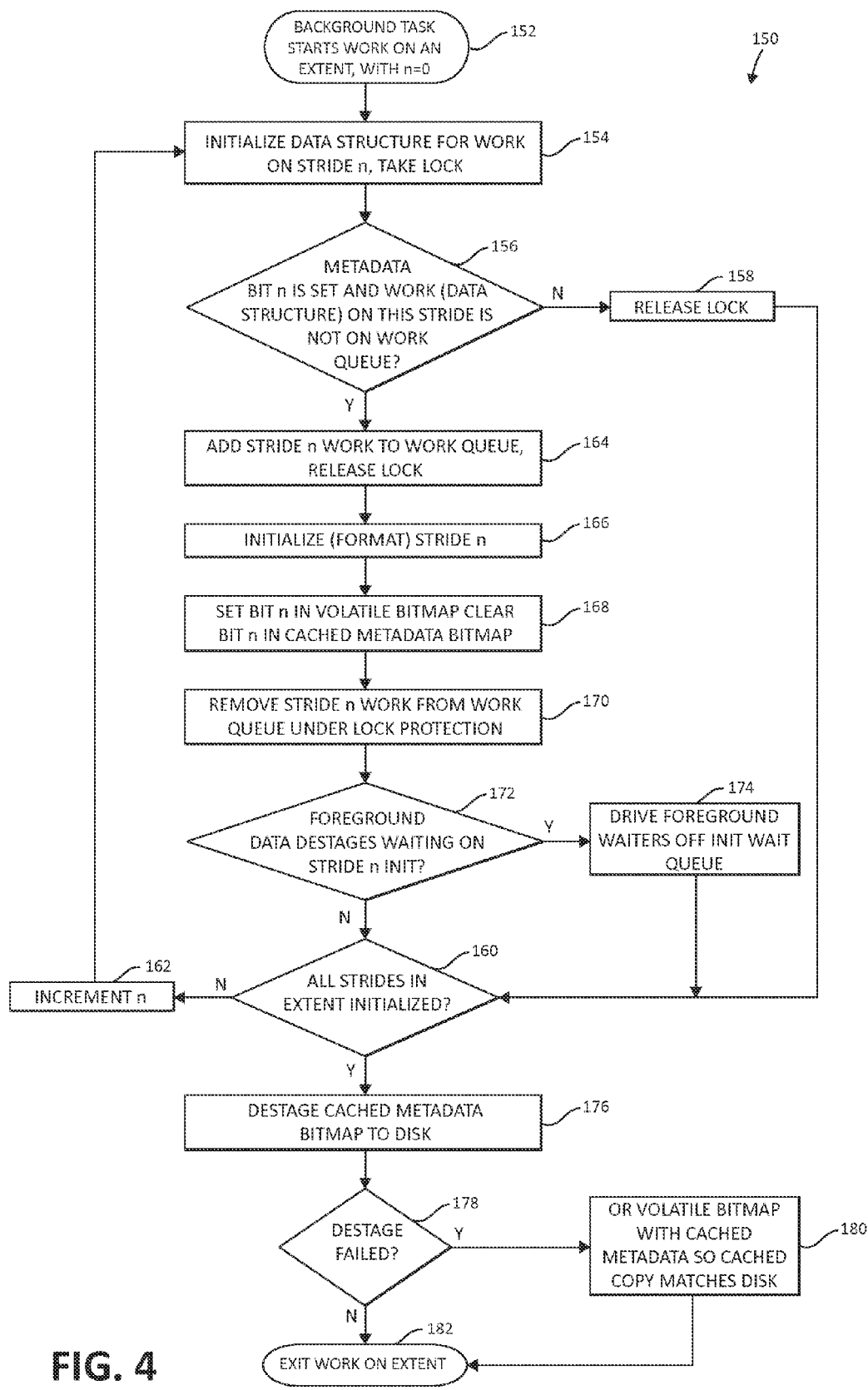
FIG. 4 is a flow chart diagram of an exemplary method for initialization according to the present invention using a background process without a data collision requiring destage of the metadata bitmap.

FIG. 4, following, illustrates an exemplary method 150 for initialization according to the present invention using a background process without a data collision requiring destage of the metadata bitmap. Method 150 begins as the background task/process begins work on an associated extent as n is made equal to zero as shown. The applicable data structure is initialized for work on a particular stride n and a lock is taken pursuant to the lock protection (step 154). As a following step, the method 150 queries as to whether the applicable metadata bit is set and work (e.g., the data structure in question) on this stride is not on the applicable work queue (step 156). If not (the metadata bit is clear or another process already has ownership of the initialization work), the lock is released (step 158) and the method 150 moves to step 160 to query whether all strides in the particular extent have been initialized (step 160). If not, n is incremented (step 162) and the method 150 returns to step 154 as indicated.

Returning to step 156, if the metadata bit is determined to be set and the stride is not on the work queue, the stride n work is added to the work queue and the lock is released (step 164). As a following step, the stride n is initialized (formatted) (step 166). The applicable bit n is set in the volatile bitmap and the corresponding bit n in the cached metadata bitmap is cleared (step 168). The stride n work is removed from the work queue under lock protection (step 170). If one or more foreground data destages are determined to be waiting on stride n initialization (step 172), the foreground task waiters are driven off the initialization wait queue (step 174), and the method 150 returns to step 160.

If in step 160, all strides in the extent are determined to have been initialized, the cached metadata bitmap is then destaged (hardened) to an associated storage device, such as a disk (step 176). If the destage fails (step 178), the applicable bit n in the volatile bitmap is OR-ed with the cached metadata bit n so that the cached copy matches what is hardened to disk (step 180). Work on the particular extent is then exited (step 182), to be revisited if metadata destage failed.

Figure 5:
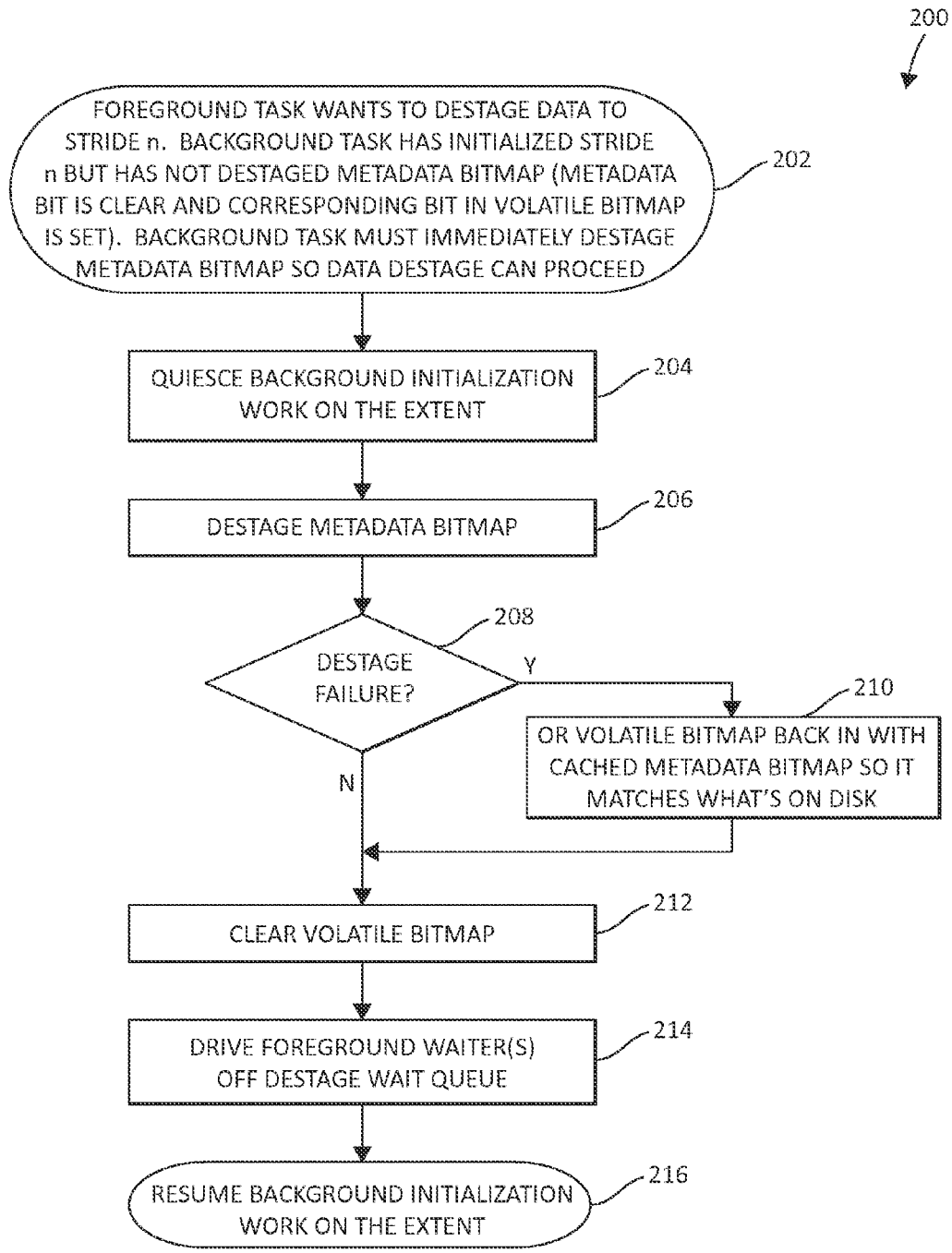
FIG. 5 is a flow chart diagram of an exemplary method for initialization according to the present invention using a background process with a data collision requiring destage of the metadata bitmap.

FIG. 5, following, illustrates an exemplary method 200 for initialization according to the present invention using a background process with a data collision requiring destage of the metadata bitmap. As a first step 202, the foreground task desires to destage data to stride n. The background task has initialized the stride n but has not destaged the metadata bitmap (i.e., the metadata bit n is clear and the corresponding bit n in the volatile bitmap is set). The background task must immediately destage the metadata bitmap so data destage operations can proceed.

As a first step following this scenario, the background initialization work on the extent is quiesced (step 204) and the metadata bitmap is destaged (step 206). If a destage failure occurs, the volatile bitmap is OR-ed back in with the cached metadata bitmap in order to match what is hardened to disk (step 210). The volatile bitmap is cleared, and any foreground waiter(s) are driven off the destage wait queue (step 214). The background initialization work then resumes on the extent (step 216).

Figure 6A:
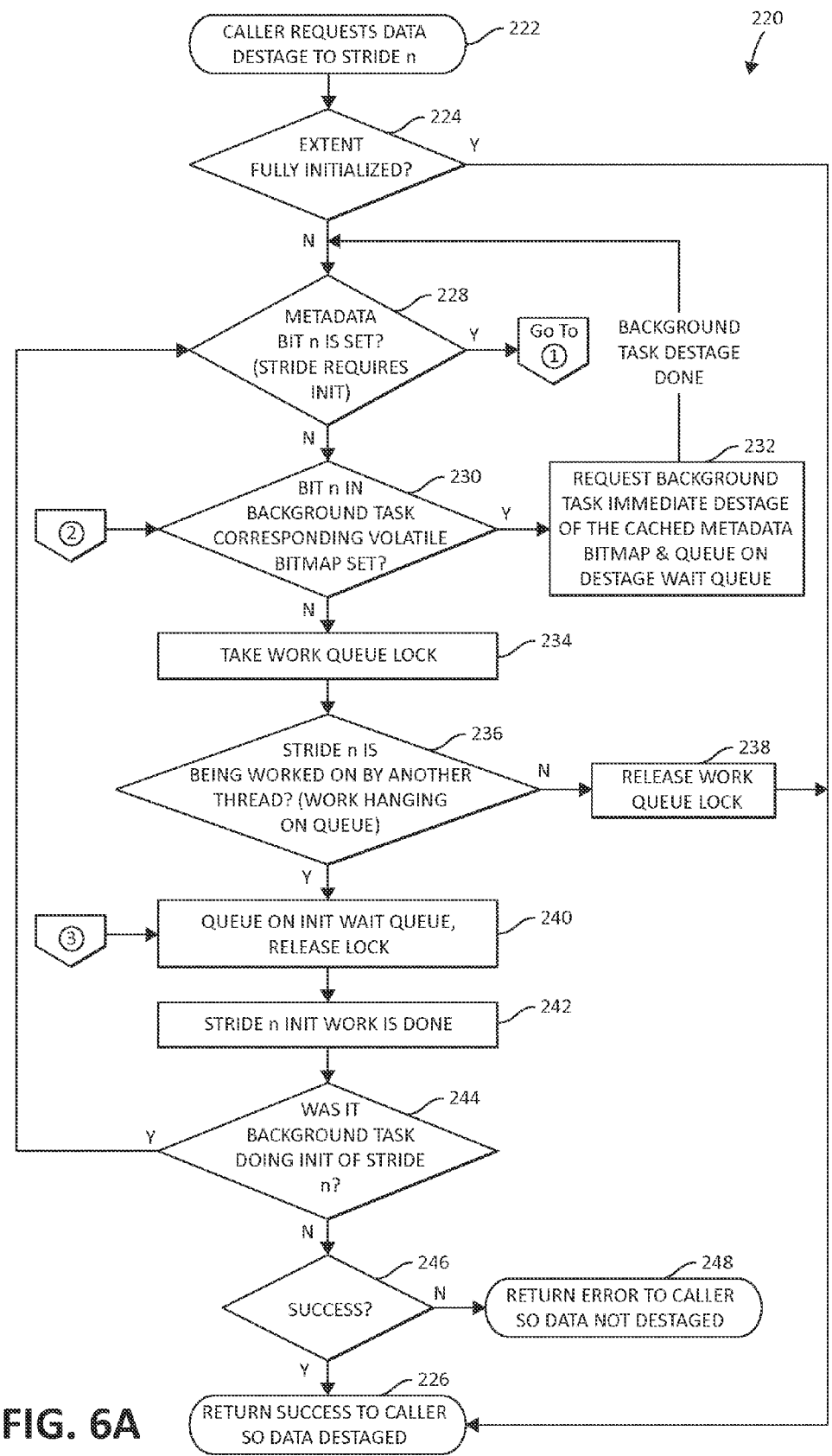
FIG. 6A is a first portion of a flow chart diagram of an exemplary method for data destage according to the present invention using a foreground process.
Figure 6B:
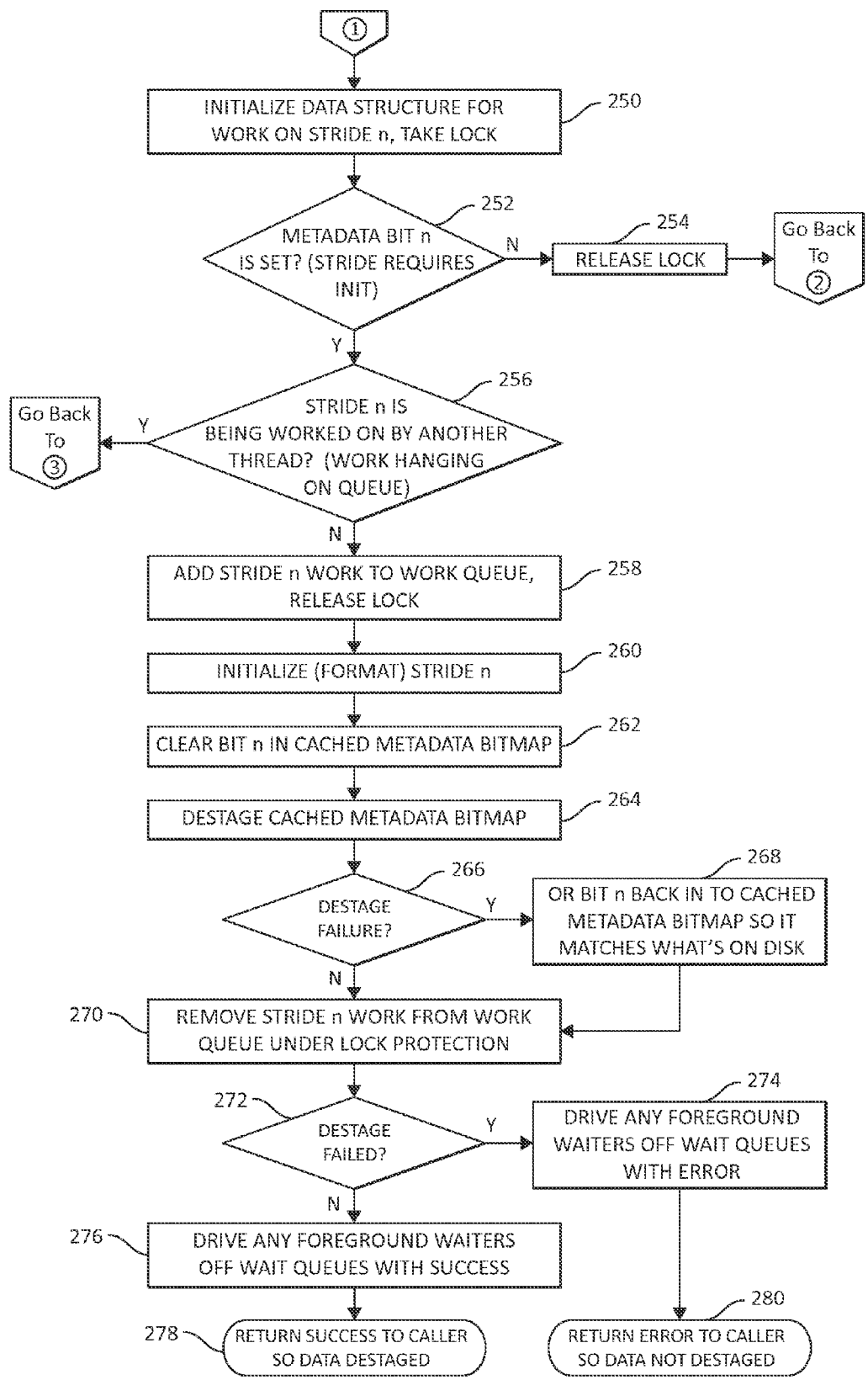
FIG. 6B is a second portion of the flow chart diagram of the exemplary method for data destage according to the present invention using a foreground process first depicted in FIG. 6A.

FIGS. 6A and 6B collectively illustrate an exemplary method 220 for data destage according to the present invention using a foreground process. As a first step, the applicable calling entity requests a data destage operation to stride n (step 222). If the extent is determined to be fully initialized (step 224), then success is returned to the calling entity, indicating that the data may be destaged (step 226).

Returning to step 224, if the extent is not fully initialized, the method 220 queries if the applicable metadata bit is set (again, the particular stride requires initialization) (step 228). If this is not the case, the applicable bit in the volatile bitmap is examined to determine if it is set (step 230). If this is not the case, then a work queue lock is taken (step 234), and the method 220 queries if the stride n is being worked on by another thread (i.e., the work is hanging on the work queue) (step 236). If this is not the case, the work queue lock is released, and the method 220 moves to step 226 as previously described.

Returning to step 236, if the work is hanging on the queue, the work is queued on the initialization wait queue, and the applicable lock is released (step 240), and the thread is at some time later driven off the initialization wait queue on completion of stride initialization (step 242). If the background task was performing the initialization of stride n, the method then returns to step 228 as depicted. If not, and the initialization work is not successful, an error is returned to the caller and the data is not destaged (step 248). If the work is successful, the method 220 moves to step 226 as previously described.

Returning to step 228, if the metadata bit n is set, the data structure for stride n is initialized for work, and a lock is taken (step 250). If the metadata bit n is not set (step 252), the lock is released (step 254), and the method returns to step 230 as previously described. If the metadata bit n is set (again, step 252), the method 220 queries whether the stride n is being worked on by another thread (again hanging on the work queue) (step 256). If yes, the method moves to step 240 as previously described. If not, the method 220 adds the stride n work to the work queue and releases the lock (step 258), initializes the stride n (step 260), clears the bit n in the cached metadata bitmap (step 262), and destages the cached metadata bitmap (step 264).

If a destage failure occurs (step 266), the bit n is OR-ed with the cached metadata bit to match what is hardened to disk (step 268). Otherwise, the stride n work is removed from the work queue under lock protection (step 270). If the destage failure has occurred (step 272), any foreground waiters are driven off the wait queue(s) with an associated error (step 274), and the error is returned to the caller, and accordingly, data is not destaged (step 280). Returning to step 272, if this is not the case, any foreground waiters are driven off the wait queue(s) with success, which is then returned to the caller and, accordingly, the data is destaged (step 278).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for storage initialization and data destage in a computing storage environment by a processor device, comprising:

initializing at least a portion of storage on a storage device operable in the computing storage environment using a background process, while performing one of simultaneously and subsequently destaging at least a portion of data to the storage device using a foreground process, wherein:

a persistent metadata bitmap, adapted to indicate whether the at least the portion of the data has been initialized, is read to a memory structure operable in the computing storage environment, and the background process maintains a volatile bitmap indicating a status of the initialization of the at least the portion of the data in direct correspondence to the persistent metadata bitmap, the volatile bitmap examined in conjunction with the read metadata bitmap to determine if a data collision has occurred, further wherein as the background process initializes the at least the portion of the data, an applicable bit on the read metadata bitmap is cleared and a corresponding bit is set on the volatile bitmap; further wherein:

a background initialization work on one of a plurality of extents is quiesced, previous to commencing destaging the at least the portion of the data, the value of the applicable bit on the read data bitmap is determined, and if the bit in the read metadata bitmap is found to be clear and the corresponding bit on the volatile bitmap is not set a work queue lock is placed on the at least the portion of the data.

2. The method of claim 1, further including, if the bit in the read metadata bitmap is found to be clear and the corresponding bit on the volatile bitmap is set, requesting the background process to perform an immediate destage of the metadata bitmap in the cache to the storage device.

3. The method of claim 1, further including, previous to commencing the initializing the at least the portion of the data, performing at least one of placing a lock protection on the at least the portion of the data and determining a value of the applicable bit on the read metadata bitmap.

4. The method of claim 3, further including, if the at least the portion of the data to be initialized is determined not to be placed on a work queue, adding the at least the portion of the data to the work queue.

5. The method of claim 3, further including, subsequent to initializing the at least the portion of the data, removing the at least the portion of the data from the work queue.

6. The method of claim 1, further including, subsequent to placing the work queue lock protection, if the at least the portion of the data is determined to not be hanging on the work queue, releasing the work queue lock.

7. A system for storage initialization and data destage in a computing storage environment, comprising:

a processor device operable in the computing storage environment, wherein the processor device is adapted for:

initializing at least a portion of storage on a storage device operable in the computing storage environment using a background process, while performing one of simultaneously and subsequently destaging at least a portion of data to the storage device using a foreground process, wherein:

a persistent metadata bitmap, adapted to indicate whether the at least the portion of the data has been initialized, is read to a memory structure operable in the computing storage environment, and the background process maintains a volatile bitmap indicating a status of the initialization of the at least the portion of the data in direct correspondence to the persistent metadata bitmap, the volatile bitmap examined in conjunction with the read metadata bitmap to determine if a data collision has occurred, further wherein as the background process initializes the at least the portion of the data, an applicable bit on the read metadata bitmap is cleared and a corresponding bit is set on the volatile bitmap; further wherein:

a background initialization work on one of a plurality of extents is quiesced, previous to commencing destaging the at least the portion of the data, the value of the applicable bit on the read data bitmap is determined, and if the bit in the read metadata bitmap is found to be clear and the corresponding bit on the volatile bitmap is not set a work queue lock is placed on the at least the portion of the data.

8. The system of claim 7, wherein the processor device, if the bit in the read metadata bitmap is found to be clear and the corresponding bit on the volatile bitmap is set, requests the background process to perform an immediate destage of the metadata bitmap in the cache to the storage device.

9. The system of claim 7, wherein the processor device, previous to commencing the initializing the at least the portion of the data, performs at least one of placing a lock protection on the at least the portion of the data and determining a value of the applicable bit on the read metadata bitmap.

10. The system of claim 9, wherein the processor device, if the at least the portion of the data to be initialized is determined not to be placed on a work queue, adds the at least the portion of the data to the work queue.

11. The system of claim 9, wherein the processor device, subsequent to initializing the at least the portion of the data, removes the at least the portion of the data from the work queue.

12. The system of claim 7, wherein the processor device, subsequent to placing the work queue lock protection, if the at least the portion of the data is determined to not be hanging on the work queue, releases the work queue lock.

13. A computer program product for storage initialization and data destage in a computing storage environment by a processor device, the computer program product comprising a non-transitory computer-readable storage medium having computer-readable program code portions stored therein, the computer-readable program code portions comprising:

a first executable portion that initializes at least a portion of storage on a storage device operable in the computing storage environment using a background process, while performing one of simultaneously and subsequently destaging at least a portion of data to the storage device using a foreground process, wherein:

a persistent metadata bitmap, adapted to indicate whether the at least the portion of the data has been initialized, is read to a memory structure operable in the computing storage environment, and the background process maintains a volatile bitmap indicating a status of the initialization of the at least the portion of the data in direct correspondence to the persistent metadata bitmap, the volatile bitmap examined in conjunction with the read metadata bitmap to determine if a data collision has occurred, further wherein as the background process initializes the at least the portion of the data, an applicable bit on the read metadata bitmap is cleared and a corresponding bit is set on the volatile bitmap; further wherein:
- a background initialization work on one of a plurality of extents is quiesced,
- previous to commencing destaging the at least the portion of the data, the value of the applicable bit on the read data bitmap is determined, and
- if the bit in the read metadata bitmap is found to be clear and the corresponding bit on the volatile bitmap is not set a work queue lock is placed on the at least the portion of the data.

14. The computer program product of claim 13, further including a second executable portion that, if the bit in the read metadata bitmap is found to be clear and the corresponding bit on the volatile bitmap is set, requests the background process to perform an immediate destage of the metadata bitmap in the cache to the storage device.

15. The computer program product of claim 13, further including a second executable portion that, previous to commencing the initializing the at least the portion of the data, performs at least one of placing a lock protection on the at least the portion of the data and determining a value of the applicable bit on the read metadata bitmap.

16. The computer program product of claim 15, further including a third executable portion that, if the at least the portion of the data to be initialized is determined not to be placed on a work queue, adds the at least the portion of the data to the work queue.

17. The computer program product of claim 15, further including a third executable portion that, subsequent to initializing the at least the portion of the data, removes the at least the portion of the data from the work queue.

18. The computer program product of claim 13, further including a second executable portion that, subsequent to placing the work queue lock protection, if the at least the portion of the data is determined to not be hanging on the work queue, releases the work queue lock.

* * * * *